United States Patent [19]

Nola

[11] 4,266,177
[45] May 5, 1981

[54] POWER FACTOR CONTROL SYSTEM FOR AC INDUCTION MOTORS

[75] Inventor: Frank J. Nola, Huntsville, Ala.

[73] Assignee: The United States of America as represented by the Administrator of the National Aeronautics and Space Administration, Washington, D.C.

[21] Appl. No.: 44,431

[22] Filed: Jun. 1, 1979

[51] Int. Cl.³ .................. H02K 17/04; H02P 5/40
[52] U.S. Cl. .................. 318/810; 318/799; 307/252 UA
[58] Field of Search .......... 318/810, 811, 812, 728, 318/827, 799, 732; 307/252 UA, 354, 809

[56] References Cited

U.S. PATENT DOCUMENTS

| | | | |
|---|---|---|---|
| 3,506,852 | 4/1970 | De Hart | 307/254 |
| 3,633,094 | 1/1972 | Clements | 307/252 UA |
| 3,821,634 | 6/1974 | Sobolic | 307/252 UA |
| 3,859,591 | 1/1975 | Saunders | 307/252 UA |
| 4,052,648 | 10/1977 | Nola | 318/810 |

Primary Examiner—David Smith, Jr.
Attorney, Agent, or Firm—George J. Porter; John R. Manning; Leon D. Wofford, Jr.

[57] ABSTRACT

A power control circuit for an induction motor wherein a servo loop is used to control power input by controlling the power factor of motor operation, and wherein the power factor is measured by summing the voltage and current derived square wave signals.

9 Claims, 3 Drawing Figures

POWER FACTOR CONTROL SYSTEM FOR AC INDUCTION MOTORS

ORIGIN OF THE INVENTION

The invention described herein was made by an employee of the United States Government, and may be manufactured and used by or for the Government of the United States for governmental purposes without the payment of any royalties thereon or therefor.

BACKGROUND OF THE INVENTION

1. Field of the Invention

This invention relates to power input controls for motors, and particularly to an improved control which varied input power to an AC induction motor responsive to a voltage-current phase (power factor) command signal, and wherein a phase comparison is made by combining the voltage and current derived square wave signals.

2. General Description of the Prior Art

In a previous patent application, now U.S. Pat. No. 4,052,648, the applicant described a power reduction system for less than fully loaded induction motors wherein the phase angle between current and voltage, motor power factor, was controlled. In the prior system, the voltage supplied to the motor and resulting current through the motor was sampled, and a pulse marking the trailing edge of each half cycle of current was developed and compared in phase with a square wave corresponding to the voltage waveform. This required significant processing of the current signal before phase comparison, and, of course, added to the cost of the system. Further, the immediate circuitry controlling the power switching device used, a triac, employed a rather complex oscillatory circuit for triggering the traic. This was determined desirable to assure that when once turned on, the traic remained on for the remainder of each half cycle of input voltage. Still further, in some applications, the response time of the prior system was too slow to respond to rapidly applied motor loads and to initial motor turn-on.

It is the object of this invention to provide a simpler system, that is, one requiring fewer components, and to provide one particularly adapted to respond to conditions wherein motor loads are abruptly incurred, and to increase the speed of full motor turn-on.

SUMMARY OF THE INVENTION

In accordance with this invention, a power factor control is constructed wherein the current-voltage phase angle is measured by the generation of a pulse which is turned on responsive to the trailing edge of a squared, constant height, half cycle of a signal derived from the voltage applied to a motor and turned off responsive to the trailing edge of a squared, constant height, trailing edge of a half cycle signal derived from a like polarity half cycle of current flow. The variable width of the pulse is translated to the proportional variable amplitude signal and then compared with a referenced or command voltage signal representing a desired power factor of operation. The resulting difference signal, a circuit error signal, is then used to control the on time of a triac in a circuit with the winding of an induction motor to maintain motor operation at the selected power factor. This has the effect of significantly reducing the power input to a less than fully loaded motor.

DETAILED DESCRIPTION OF THE DRAWINGS

Figure 1:
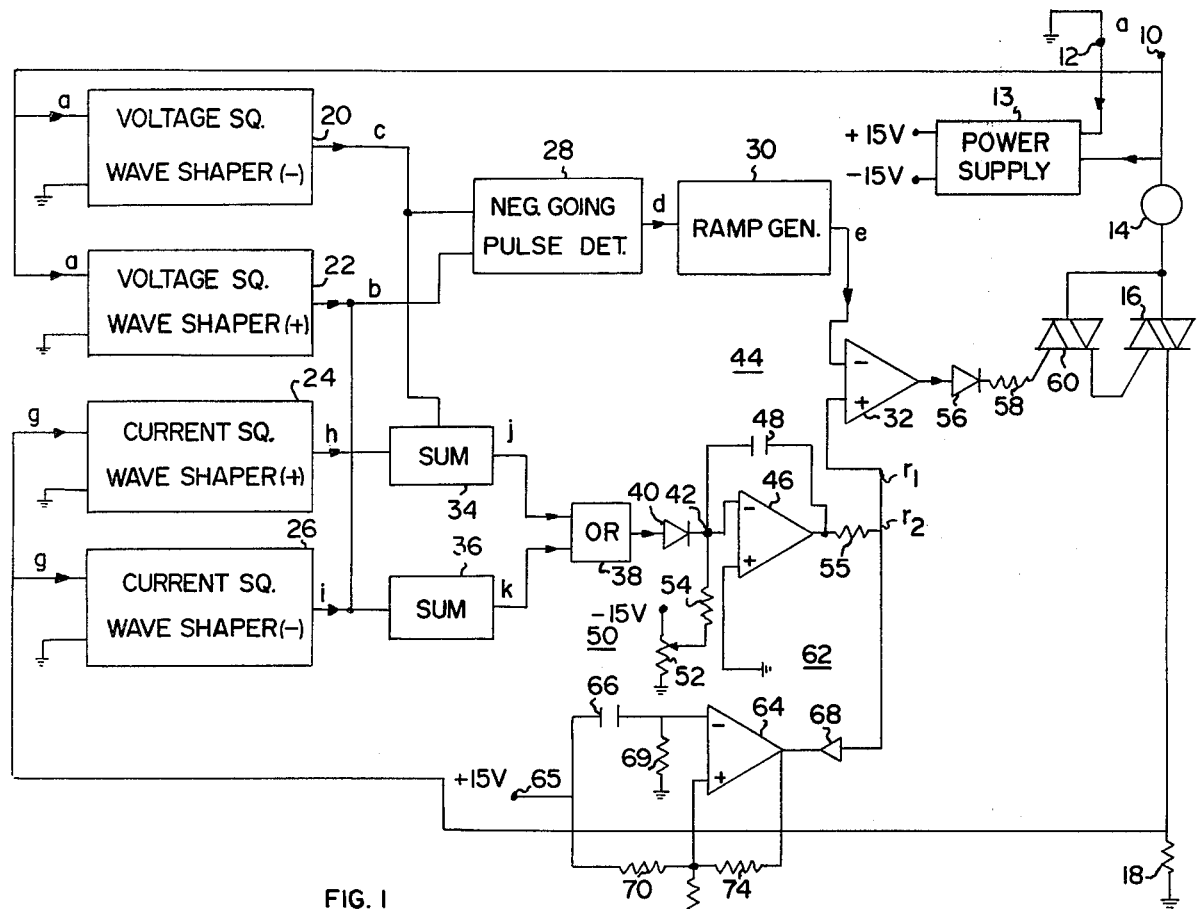
FIG. 1 is an electrical schematic diagram of an embodiment of the invention.
Figure 3:
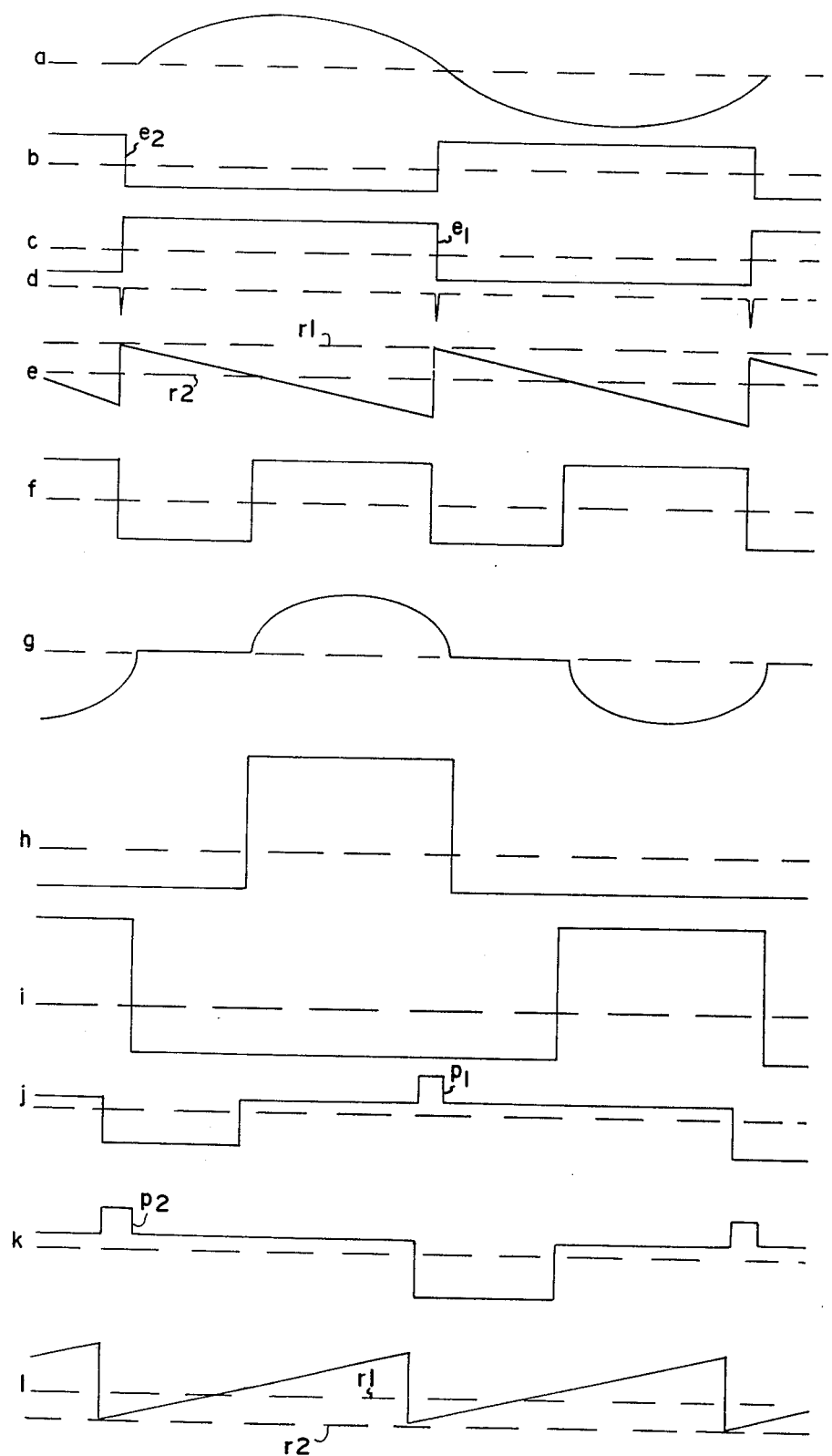
FIG. 3 shows a series of waveforms illustrating aspects of the operation of the embodiments shown in FIGS. 1 and 2.

Referring to FIG. 1, an alternating current source (115 volts AC and shown as waveform (a) of FIG. 3) is connected across terminals 10 and 12. This supplies this voltage to circuit bias supply 13 and across a series circuit including a winding or windings of motor 14, triac 16, and current resistor 18. The input voltage signal is also applied to voltage squaring wave shapers 20 and 22, shaper 22 providing a first phased, full wave, rectangular wave output as shown in waveform (b) of FIG. 3; and voltage squaring wave shaper 20 providing an oppositely phased, full wave, rectangular wave output as shown in waveform (c) of FIG. 3. A signal voltage across resistor 18, shown as waveform (g) in FIG. 3, and representative of motor current, is applied to the inputs of full wave current squiring wave shapers 24 and 26, shaper 24, being responsive only to the positive half cycle of current waveform (d), providing a first phased, full wave, rectangular wave output as shown in waveform (h) of FIG. 3. Wave shaper 26, being responsive only to the negative half cycle of current waveform (d), provides an oppositely phased, full wave, rectangular wave output as shown in waveform (i) of FIG. 3. The bias outputs of supply 13 power the indicated bias requirements as well as generally supply bias power to all active elements in the circuit by connections not shown.

An output of each of voltage square wave shapers 20 and 22 are fed to negative going pulse detector 28 which provides a negative spike output (waveform (d) of FIG. 3). The spike pulses are then fed to ramp generator 30 which provides a ramp waveform as shown in waveform (e) of FIG. 3. This ramp waveform is applied to the (−) (inverting) input of differential or operational amplifier 32, which functions as a zero crossing detector responsive to the combination of the ramp waveform and a control signal applied to the positive (non-inverting) input of amplifier 32, as will be further explained.

The control signal is a function of phase difference between the current and voltage and a command signal. This phase difference, that is, the phase difference between the current and voltage applied to motor 14, is detected each half cycle. Phase difference is detected by a selected combination of the outputs of square wave shapers 20, 22, 24, and 26. Thus, the outputs of shapers 20 and 24 are summed in summing device 34 to provide a signal output as shown in waveform (j) of FIG. 3, and the outputs of wave shapers 22 and 26 are summed in summing device 36 to provide an output as shown in waveform (k) of FIG. 3. As a result, each of the outputs of summing devices 34 and 36 provides superimposed pulses, pulses p1 (waveform j) and p2 (waveform k), which are of a duration representative of the phase difference between applied voltage to and current through motor 14. This occurs because, in effect, the turn-off of a summed voltage square wave established the rise point of those superimposed pulses, and the trailing edge of the current derived square wave produces the trailing edges of the superimposed pulses.

As will be noted in waveforms (j) and (k), a superimposed pulse occurs each half cycle of the AC input. In order to use them both, the outputs of summing devices 34 and 36 are fed to OR circuit 38 which presents both at its output. The output of OR circuit 38 is fed through rectifier 40 preparatory to integration, and there is applied at junction 42 pulses p1 and p2 appearing each half cycle of signal voltage. They are of a constant height, but of variable width, width varying as a direct function of phase angle between current voltage. Although pulses p1 and p2 are fed to summing junction 42, they alone do not appear at this point as there are two other influential circuits connected to it. The first of these is integrator 44. It functions to provide an averaged or integrated value for pulses p1 and p2, which thus converts the pulse width modulated pulses to an amplitude modulated signal.

Integrator 44 comprises an operational amplifier 46 and capacitor 48 (e.g., 1 Mfd.), the inverting input of operational amplifier 46 being connected to summing junction 42, and capacitor 48 being connected between this point and the output of operational amplifier 46.

A third circuit connected to summing junction 42 is command signal circuit 50 consisting of potentiometer 52, across which is connected a negative 15 volts source. This circuit is connected to summing junction 42 via summing resistor 54 and provides a bucking (opposite polarity) voltage to that provided by the amplitude of the detected phase difference signal. The (+) or non-inverting input of amplifier 46 is connected to a ground reference.

A command signal from circuit 50 is set with motor 14 unloaded and by adjustment of potentiometer 52. In effect, it sets a selected power factor (or phase angle between current and voltage) as determined by the greatest power factor (smallest motor current-voltage phase difference) at which the motor will operate over a range of loadings to be encountered, as will be further explained. The resulting control signal, which appears at the output of operational amplifier 46, is a negative signal which shifts positively responsive to the presence of a higher than commanded power factor, and shifts negatively when there is detected a lower than commanded power factor. It is employed in a servo loop to vary the applied voltage and control the input power to motor 14. In this way, motor 14 is forced to operate at the selected power factor. In a typical case, it might be found that without the present control, the motor would operate with a power factor of 0.75 when fully loaded and a power factor of 0.15 when unloaded, but that with the control system of this invention, it may be operated at a relatively constant power factor of 0.85 regardless of loading conditions. In such case, this enables motors which are less than fully loaded to draw significantly reduced power.

The control signal from the output of operational amplifier 46 is coupled through resistor 55 and is applied to the positive (non-inverting) input of operational amplifier 32, operating as a zero crossing detector. This control signal has the effect of varying the response of operational amplifier 32 to the ramp signal shown in waveform (e) and which is applied to the negative or inverting input of amplifier 32. Thus, with a basically zero level of control signal, represented by reference r1, being in the top position, operational amplifier 32 would be essentially fully held positive by the ramp signal, resulting in a triggering output from amplifier 32 which stays on. As a typical value of negative control signal, represented by reference r2, the relative position of reference r2 with respect to the ramp signal is such that operational amplifier 32 will be triggered on during the latter portion of each ramp signal, commencing with the intersecting of the ramp signal with reference line r2. This produces a positive pulse output from operational amplifier 32 as indicated in waveform (f) shown with approximately 50% "on" time. The output of operational amplifier 32 is applied through diode 56 and resistor 58 to the gate input of triggering or buffer triac 60, and its output is connected to the trigger input of triac 16 which is in circuit with motor 14. Accordingly, as shown, triac 16 is turned on each cycle for the pulse width of the positive pulse shown in waveform (f) for about 50% of the time of each half cycle of the AC input to motor 14. This state would typically occur for a medium loading of motor 14. If motor load should increase, this would be detected by a decreased phase angle; and in correcting this, the feedback system of the circuit would raise the control voltage and increase the turn-on time of triac 16. If the motor load is shifted downward, the opposite would occur, and turn-on time of triac 16 would be reduced. The net result is that when motor 14 is less than fully loaded, it is driven by a substantially lower average voltage, and thereby draws substantially power than were the control circuit of this invention not employed.

As a matter of economy, the control circuit shown may be powered by relatively inexpensive transformerless power supplies for bias power supply 13. However, in such case, relatively large capacitors are typically necessary, and this slows full voltage output and start-up time of the circuitry. This in turn may prevent a motor from having a sufficient starting voltage (average voltage through triac 16) initially applied to it for effective starting. To compensate for this, delay circuit 62 is shown which delays any power from being applied to motor 14 until operating biases are essentially at full operating levels. The circuit employs operational amplifier 64 and a +15 volts bias terminal 65 (from power supply 13) which is connected through 1 Mfd. capacitor 66 to the inverting input of amplifier 64. The output of amplifier 64 is connected through diode 68, poled as shown, to the (+) input of operational amplifier 32.

With the application of power across terminals 10 and 12 and to an input of power supply 13 providing bias potential to the circuit elements, the bias potential on terminal 65 will commence rising, and this change will appear through capacitor 66 and on the inverting terminal of operational amplifier 64. This occurs as capacitor 66 is charged through resistor 69 (500K ohms); and during this occurrence, the rising positive potential on this input of amplifier 64 will produce an increasing negative signal at the output of amplifier 64. Diode 68 will then couple this potential to the (+) (non-inverting) input of operational amplifier 32 which will swamp any control output from operational amplifier 46 and initially hold a significant negative (turn-off) potential on the input of amplifier 32. This thus will prevent triac 60 from triggering triac 16. In this manner, motor 14 is initially prevented from being turned on. This state of prevention will continue until operating biases of the circuit, including the +15 volts on terminal 65, are essentially up to full potential. When this occurs, as evidenced by an essentially full +15 volts on terminal 65, capacitor 66 will become fully charged, and the input applied to the negative input of operational amplifier 64 will drop. When this occurs, the +15 volts potential on terminal 65 will be effectively applied through 51K ohm resistor 70 and across 3.9K ohm resistor 72 to the (+) input of operational amplifier 64, with the effect that amplifier 64 will be transitioned to provide a +15 volts output. This process is accelerated by positive feedback resistor 74 connected between the output and (+) input of amplifier 64. With the output positive, diode 68 is blocked, and the normal operating output from amplifier 46 is applied to the (+) input of amplifier 32. Since initially there is no current feedback from motor 14 (via resistor 18), the full command voltage would be effected to cause a full positive potential to be applied to amplifier 46 to the (+) terminal of amplifier 32 which then would cause a full turn-on potential to be applied to triac 60, and thereby to triac 16. Thus at this point, motor 14 would be enabled to quickly turn full on.

Figure 2:
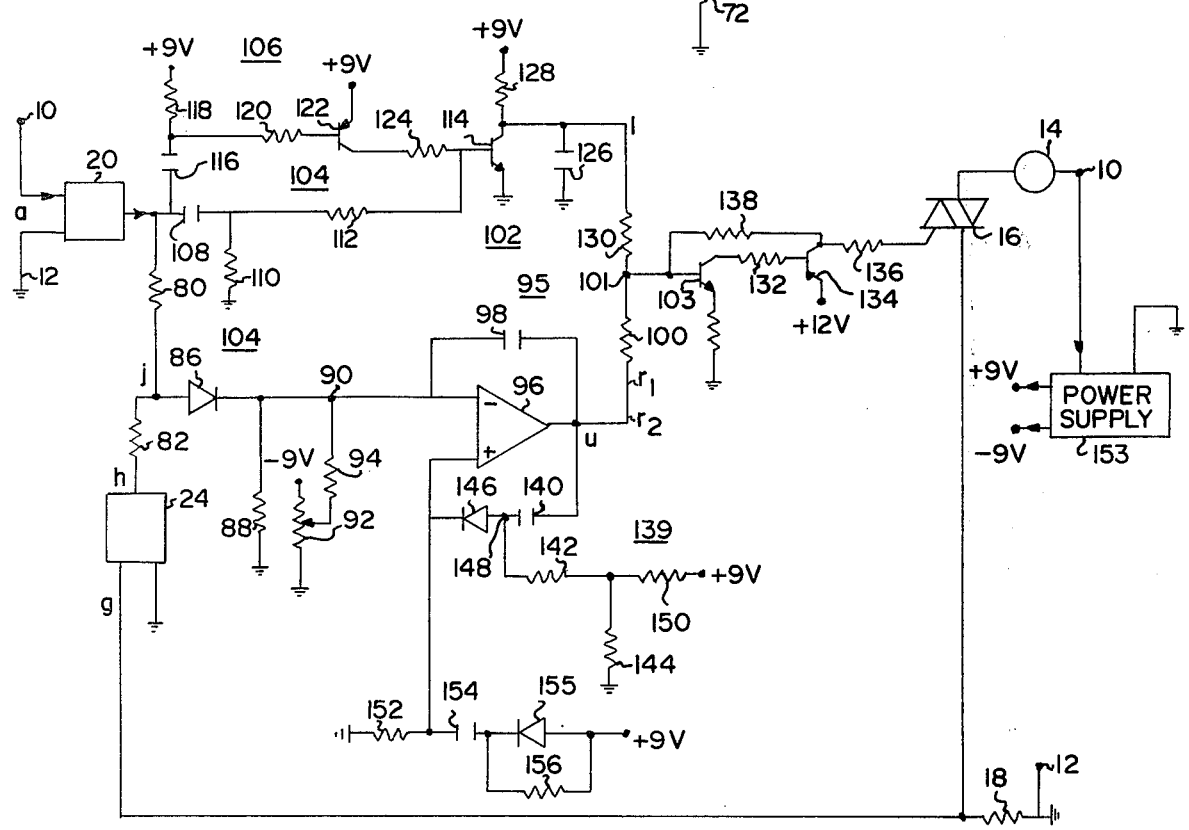
FIG. 2 is an alternate embodiment of the invention, somewhat simpler than the one shown in FIG. 1, and wherein sampling of operating parameters is effected once in each full cycle of input power as opposed to twice in each such sample as in the case of the embodiment shown in FIG. 1.

The embodiment of the invention shown in FIG. 2 functions basically in the same manner as the one shown in FIG. 1, and certain of the components carry the same designations. The circuit differs principally in that phase angle detection is effected only once each half cycle. Thus, the circuit of FIG. 2 employs only a single voltage square wave shaper 20 and a single current square wave shaper 24. The outputs of these wave shapers are identical to waveforms (c) and (h), respectively. Their outputs are supplied through resistors 80 and 82, respectively, to summing junction 84 where a waveform as shown in waveform (j) would result. The positive portion of this waveform is transmitted via diode 86 and appears across resistor 88 and summing junction 90 where it is summed with a command signal derived from potentiometer 92 and fed through resistor 94 in the same manner as described above with respect to FIG. 1. The sum signal is fed to integrator 95 like the one shown in FIG. 1, and in this case consisting of amplifier 96 and capacitor 98. The output of amplifier 96 is applied through summing resistor 100 to summing junction 101 at the base input of NPN transistor 103. This output, directly represented by reference lines r1 and r2 of waveform (1), is combined at this input with the ramp voltage shown in waveform (1) of FIG. 3 and which is supplied by ramp generator 102. It is of opposite polarity to the one shown in waveform (h) as a matter of circuit convenience.

Considering now the generation of the ramp waveform, since there is only a single phase voltage square wave output available in the circuit, an output from voltage square wave shaper 20, circuit modifications are required to generate a trigger pulse each half cycle as needed to generate the ramp signal each half cycle as shown. This is accomplished by providing two differentiating circuits, circuits 104 and 106, and passing the output of one of them, circuit 106, through a phase reversal stage. Thereafter, the resulting waveforms are combined to provide two like phased trigger pulses occurring at half cycle intervals. In one case, the output of voltage square wave shaper 20 is differentiated by the combination of capacitor 108 and resistor 80 and is applied across resistor 110 and through summing resistor 112 to provide a first trigger input to the base of NPN transistor 114 of ramp generator 102. Transistor 114 responds to a positive going spike occurring at the rising or positive going edge of waveform (b) to briefly turn transistor 114 on. The second necessary trigger signal is developed by applying the output of wave shaper 20 to differentiator 106, consisting of capacitor 116 and resistor 118, and passing the differentiated signal through current limiting resistor 120 to the base input of PNP phase reversing transistor 122. Since the base of transistor 122 is biased positive by virtue of +9 volts terminal being connected through resistor 120, transistor 122 does not respond to the differentiated rising edge of waveform (b) which produced the first input to transistor 114. However, one half cycle later, upon the occurrence of the negative going edge of the first half cycle of square wave (b), there appears a negative going spike at the output of differentiator 106 which does trigger transistor 122, and as a result, to apply a positive going spike, and thus triggering pulse, through resistor 124 to the base input of transistor 114. Thus, transistor 114 is triggered each cycle by positive going spikes which cause it to be turned on each half cycle, shorting capacitor 126. Thereafter, after the removal of a spike, transistor 114 turns off, causing capacitor 126 to charge through resistor 128 to produce the ramp wave shown in waveform (1).

The output of ramp generator 102 is applied through summing resistor 130 to the base of NPN transistor 103 which functions as a zero crossing detector. The emitter of transistor 103 is connected to ground through resistor 131. Transistor 103 sees the algebraic sum of the ramp signal and control signal as is applied through resistors 100 and 130 and provides an output when the sum of the applied voltage rises above the reference or zero voltage, this occurring in the same fashion as described above with respect to FIG. 1, as represented by reference control lines r1 and r2 in their relation to the ramp wave shown in waveform (1). The collector output of transistor 103 is direct coupled through resistor 132 to PNP transistor 134 which amplifies the trigger output of transistor 103, and the trigger amplified output is applied through resistor 136 to the gate input of triac 16, connected with its switched leads in series between motor 14 and resistor 18 across 115 volts AC. Resistor 138 connects between the collector of transistor 134 and the base of transistor 103 in order to provide positive feedback to increase the rise and fall time of the pulse applied to the triac.

The operation of the circuit shown in FIG. 2 is basically the same as shown in FIG. 1 in that the duty cycle of triac 14 is varied in response to the control signal which is a combination of the command signal as provided through potentiometer 92 and the voltage-current phase difference signal represented by the width of a pulse illustrated by waveform (i). The effect of the command signal is to maintain the operation of a discrete phase angle between voltage and current, or power factor, which is selected as being an optimum value as determined by a test of the motor at hand. For example, this value is selected as being as small an angle as the motor will tolerate. That is, the angle is adjusted downward with the motor unloaded until motor operation is reduced to a point which is the lowest operating power point at which the motor will stably run and respond to increased application of load on the motor.

In some instances, the control circuitry thus far described may not provide sufficient speed of response to adequately respond to rapidly increased motor loads, such as a load applied through a clutch. Accordingly, there has been added to the control circuitry of FIG. 2 means of overcoming this problem. It is to be noted that the problem arises by virtue of the fact that capacitor 98, connected between the output and inverting input of amplifier 96, and functioning as an integrator, or pulse width to amplitude detector, basically slows the response of this amplifier in order to do its job. To temporarily override this characteristic, snap-on circuit 139 is employed. Basically, it includes a differentiation circuit connected as a positive feedback loop between the output of amplifier 96 and its positive or non-inverting input. This differentiation circuit basically consists of series capacitor 140 and parallel connected resistance consisting of resistors 142 and 144 connected between output terminal 144 of capacitor 140 and ground. Terminal 144 is also connected to the positive input of amplifier 96 through a diode 146 which, together with a level setting bias source applied to terminal 148 and through resistors 150, 142, and 152, sets the sensitivity of the feedback loop.

In operation, when a sudden increase in motor load occurs and the output of amplifier 96 starts to increase, change rather slowly in a positive direction, this positive going output is differentiated; and when the differential voltage is sufficient to overcome the forward voltage threshold of diode 146, as modified by the level setting bias, the differential voltages applied to the positive input of amplifier 96 causes the output to further increase. Since this differentiation circuit is connected in a positive feedback loop, the effect is regenerative, and the output of amplifier 96 rapidly moves to a maximum positive output. This thus applies a maximum turn-on polarity signal through resistor 100 to the base input of transistor 103, causing a signal flow to rapidly and fully turn on triac 16, and thus overcoming the integrative action of the circuit. When the output of amplifier 96 peaks and there is no further upward change in signal, the differential signal drops to zero, and the differential circuit has no effect, causing amplifier 96 to be thereafter controlled normally by integrator 95 as described above.

FIG. 2 also includes means for rapidly providing full voltage to a motor when first started. Basically, this is effected by capacitor 154 connected in series with diode 155 between a +9 volts terminal, from DC power source 153, and the non-inverting (+) input of amplifier 96 across resistor 152. Thus, when power is first turned on, a positive voltage will appear across the non-inverting input as a charging current, through resistor 152, to capacitor 154, as capacitor 154 is charging upward to the 9 volts level. This causes the output of amplifier 96 to go full positive, and thus provides a full turned-on signal at the input of transistor 103. After capacitor 154 is charged, the voltage across resistor 152 disappears and normal circuit operation would be resumed.

To assure compatibility between the acceleration circuit and the motor turn-on circuit, diode 155 is poled to enable charging of capacitor 154 as described, but blocking its discharge. Thus, after the capacitor is charged, diode 155 blocks any current flow through capacitor 154 which might otherwise rise from operation of snap-on circuit 139 when it is called upon responsive to an increased motor load. Were diode 155 not employed, capacitor 154 could effectively load down the snap-on circuit to prevent its operation. In instances where snap-on circuit 139 is not employed, diode 155 need not be employed. Where diode 155 is employed, in order to provide slow discharge of capacitor 154 after shutdown so that it will be ready to operate when the circuit is restarted, resistor 156 (e.g., 1.5 Meg, ohms) is necessary to discharge capacitor 154 in the interim between usage.

Having thus described my invention, what is claimed is:

1. A power factor control system for an AC induction motor comprising:
    current sampling means including means adapted to be placed in circuit with a winding of a said motor for providing a rectangular output signal timed to turn on responsive to detected current flow through said winding;
    voltage sampling means adapted to sense the voltage of an electrical input applied to said winding and for providing a rectangular wave output signal timed to change with changes in polarity of said voltage across said winding;
    summing means for adding the current and voltage rectangular wave output signals and providing a pulse output of constant height and having a duration proportional to the phase difference of current and voltage;
    a power factor command signal;
    difference means for subtracting said command signal from an averaged amplitude of said pulse output of said summing means and providing a difference signal; and
    control means, including a signal responsive switch electrically connected in series with a said winding of said motor, and responsive to said difference signal for varying the duration of "on" time of said switch during each cycle of input power to a said winding as a direct function of load on said motor.

2. A power factor control system as set forth in claim 1 where half cycles of reoccurring full cycles of current and voltage are sampled by said current sampling means and voltage sampling means, respectively.

3. A power factor control system as set forth in claim 2 wherein also the remaining half cycles of current and voltage are sampled by said current sampling means and voltage sampling means, respectively, to provide full wave sampling.

4. A power factor control system as set forth in claim 1 wherein:
    said control means includes ramp generating means responsive to the output of said voltage sampling means for providing a ramp wave responsive to the occurrence of each half cycle of the rectangular output of said voltage sampling means;
    said ramp wave varies both positive and negative with respect to the difference signal;
    combining means responsive to said difference signal and said ramp wave for varying the position of said ramp wave with respect to said difference signal for providing a trigger output each time that a ramp portion of said ramp wave crosses said reference level; and
    trigger means for triggering said switch responsive to the output of said combining means.

5. A power factor control system as set forth in claim 4 wherein:
    said combining means comprises a differential amplifier, and the output of said ramp generating means is connected to one input, and the output of said difference means is connected to the other output;

said switching means comprises:
- a first triac having a control input terminal and a pair of switched terminals, said switched terminals being connected in circuit with said winding, and
- a second triac having a control input terminal and a pair of switched terminals, and one of its switched terminals being connected to one of the switched terminals of said first triac, and its other switched terminal being connected to the control input of said first triac; and
- coupling means comprising a diode connecting the output of said differential amplifier to the control input of said second triac.

6. A power factor control system as set forth in claim 1 further comprising delay means responsive to the initial application of power to said system for disabling said control means and preventing "on" time for a selected initial period.

7. A power factor control system as set forth in claim 1 wherein:
said difference means includes an operational amplifier wherein:
- said command signal is of a first polarity, and said pulse output of said summing means is of an opposite polarity, and both said command signal and said pulse output of said summing means are applied to the inverting input of said operational amplifier, and
- a capacitor is connected from input to output of said operational amplifier for effecting an integrated, averaged, amplitude output of said output of said summing means.

8. A power factor control system as set forth in claim 7 further comprising:
differentiating means interconnecting the output and non-inverting input of said operational amplifier for applying as a positive feedback a differential signal which cancels the integrative effect of said capacitor during a period when said difference signal is changing in a direction producing a longer duration of said "on" signal, thereby enabling a motor to be very rapidly turned fully "on" on a sudden increase of load applied to the motor.

9. A power factor control system as set forth in claim 8 further comprising:
an AC energized source of direct current adapted to power said system, and a second capacitor connected between one polarity terminal of said source and the non-inverting input of said operational amplifier, and a resistor being connected between said non-inverting input and a reference terminal of said source; and
the polarity of connection of said source to said capacitor being such as to provide on said non-inverting input a signal during the charging of said capacitor which will produce a signal on the output of said operational amplifier adapted to produce a full duration "on" signal by said control means;
whereby, when said source is initially energized, said motor will initially be fully powered.

* * * * *